(12) United States Patent
Pan et al.

(10) Patent No.: US 10,497,914 B2
(45) Date of Patent: Dec. 3, 2019

(54) WATER-BASED COMPOSITION USED FOR MODIFYING DIAPHRAGM FOR LITHIUM BATTERIES AND MODIFIED DIAPHRAGM AND BATTERIES

(71) Applicant: CHENGDU ZHONGKE LAIFANG POWER SCIENCE & TECHNOLOGY CO., LTD., Sichuan (CN)

(72) Inventors: Zhonglai Pan, Sichuan (CN); Lu Wang, Sichuan (CN); Jiandong Gao, Sichuan (CN); Rengui Li, Sichuan (CN); Hongchang Du, Sichuan (CN); Jiamin Deng, Sichuan (CN); Zhenghua Deng, Sichuan (CN)

(73) Assignee: CHENGDU ZHONGKE LAIFANG POWER SCIENCE & TECHNOLOGY CO., LTD., Chengdu (CN)

( * ) Notice: Subject to any disclaimer, the term of this patent is extended or adjusted under 35 U.S.C. 154(b) by 48 days.

(21) Appl. No.: 15/322,357

(22) PCT Filed: Jul. 11, 2014

(86) PCT No.: PCT/CN2014/082046
§ 371 (c)(1),
(2) Date: Dec. 27, 2016

(87) PCT Pub. No.: WO2016/000276
PCT Pub. Date: Jan. 7, 2016

(65) Prior Publication Data
US 2017/0162848 A1 Jun. 8, 2017

(30) Foreign Application Priority Data
Jun. 30, 2014 (CN) .......................... 2014 1 0304690

(51) Int. Cl.
*H01M 2/16* (2006.01)
*C09D 7/40* (2018.01)
(Continued)

(52) U.S. Cl.
CPC .......... *H01M 2/1653* (2013.01); *B32B 27/32* (2013.01); *C08J 7/047* (2013.01); *C09D 7/40* (2018.01);
(Continued)

(58) Field of Classification Search
CPC ......... C08J 7/047; C08J 2423/08; C08K 9/04; C08K 2201/011; B32B 27/32;
(Continued)

(56) References Cited

U.S. PATENT DOCUMENTS

2008/0153694 A1* 6/2008 Nishi .................... C01B 33/128
502/401
2010/0249271 A1* 9/2010 Matyjaszewski ..... C08F 265/04
523/205

FOREIGN PATENT DOCUMENTS

CN 101981727 A 2/2011
CN 102089901 A 6/2011
(Continued)

OTHER PUBLICATIONS

International Search Report issued for PCT/CN2014/082046 dated Mar. 31, 2015.

*Primary Examiner* — Cynthia H Kelly
*Assistant Examiner* — Monique M Wills
(74) *Attorney, Agent, or Firm* — Caesar Rivise, PC

(57) ABSTRACT

The invention belongs to the technical field of the preparation of lithium ion batteries, and particularly relates to a water-based composition used for modifying diaphragm of lithium ion batteries and a polyolefin diaphragm for lithium ion batteries and lithium ion batteries. The invention aims to
(Continued)

improve the strength of the battery cell, to reduce the expansion of thickness of battery cell at high temperature and to simplify the battery production process. The water-based composition for modifying the diaphragm for the lithium ion battery comprises a water-based adhesive for the lithium ion battery and organic nano-particle fillings dispersed in the water-based adhesive; the organic nano-particle fillings are nano-particles of the polymers 1 or nano-particles at least wrapped with the polymers 1 on the surfaces; and the particle sizes of the organic nano-particles are 50 to 2000 nm. The polymers 1 are selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA), ethylene-ethyl acrylate copolymer (EEA) or polyurethane (PTU) polymer.

17 Claims, 6 Drawing Sheets

(51) Int. Cl.
  *B32B 27/32* (2006.01)
  *C09D 133/02* (2006.01)
  *C09D 133/08* (2006.01)
  *C09D 133/10* (2006.01)
  *C09D 133/12* (2006.01)
  *C09D 175/04* (2006.01)
  *C09J 11/08* (2006.01)
  *H01M 2/14* (2006.01)
  *H01M 10/052* (2010.01)
  *C08J 7/04* (2006.01)
  *C09D 125/16* (2006.01)
  *C09D 129/04* (2006.01)
  *C09D 133/14* (2006.01)
  *C08K 9/04* (2006.01)
  *H01M 10/0525* (2010.01)
  *C08K 3/22* (2006.01)

(52) U.S. Cl.
  CPC ......... *C09D 125/16* (2013.01); *C09D 129/04* (2013.01); *C09D 133/02* (2013.01); *C09D 133/08* (2013.01); *C09D 133/10* (2013.01); *C09D 133/12* (2013.01); *C09D 133/14* (2013.01); *C09D 175/04* (2013.01); *C09J 11/08* (2013.01); *H01M 2/145* (2013.01); *H01M 2/166* (2013.01); *H01M 2/1686* (2013.01); *H01M 10/052* (2013.01); *C08J 2323/02* (2013.01); *C08J 2423/08* (2013.01); *C08K 3/22* (2013.01); *C08K 9/04* (2013.01); *C08K 2201/011* (2013.01); *H01M 10/0525* (2013.01); *Y02T 10/7011* (2013.01)

(58) Field of Classification Search
  CPC .. C09D 133/02; H01M 2/145; H01M 2/1653; H01M 2/166
  See application file for complete search history.

(56) References Cited

FOREIGN PATENT DOCUMENTS

| | | |
|---|---|---|
| CN | 102917876 A | 2/2013 |
| CN | 103236511 A | 8/2013 |
| CN | 103603178 A | 2/2014 |

\* cited by examiner particle size range (μm)

WATER-BASED COMPOSITION USED FOR MODIFYING DIAPHRAGM FOR LITHIUM BATTERIES AND MODIFIED DIAPHRAGM AND BATTERIES

CROSS-REFERENCE TO RELATED APPLICATIONS

This application claims the benefit of Chinese Application No. 201410304690.X filed Jul. 28, 2014, which are incorporated herein in their entireties.

FIELD OF THE INVENTION

The invention belongs to the technical field of the preparation of lithium ion batteries, and particularly relates to a water-based composition used for modifying diaphragm of lithium ion batteries and a polyolefin diaphragm for lithium ion batteries and lithium ion batteries.

DESCRIPTION OF THE RELATED ART

The lithium battery is widely applied to 3C products such as personal computers, mobile telephones, etc., and at present, it has become the optimum selection of the power source of electric automobiles. With the continuous improvement of development demands on terminal equipment, personal computers, mobile telephones, etc. tend to the large-scale and thinning development, so it requires that the battery has certain strength while being thinner and thinner besides it is high in energy density, long in cycle life and high in safety.

The strength of the traditional lithium battery is significantly weakened as the thickness is reduced. In particular, due to the poor hardness and ease of distortion of the large-size battery, its application in devices may be affected, and even the performance and safety of the battery may also be seriously affected. The reason why the strength of the battery is poor is that the positive electrode, the diaphragm and the negative electrode of the traditional battery are combined sequentially in a stack, and the electrode is injected. Due to the sliding between the relative positions of the positive electrode and the diaphragm and between the diaphragm and the negative electrode under the action of the smooth surface of the diaphragm and the lubrication of the added electrolyte, and due to the fact that the positive electrode piece and the negative electrode piece are sheets which consist of metal foil and inorganic powder that are 100 micrometers in thickness and poor in strength, the strength of the formed battery can only be supported by the physical superposition of the 100 micrometer electrode pieces, and relative displacement exists between layers, resulting in non-conformity with the battery strength application requirements of various devices during the actual application process. Additionally, distortion of the battery may be caused by the increased area of the battery, and thereby affect the safety of the battery and even cause the battery to burn or explode.

Aiming at the above problems, at present, there are the following solutions:

1. The traditional polyolefin diaphragm is replaced by using the polyvinylidene fluoride (PVDF) polymer or the PVDF polymer is coated on the surface of the polyolefin diaphragm, and the gel electrolyte is produced under the action of the PVDF polymer and the electrolyte solution; the strength of the battery is improved by the permeation of gel in electrode micropores. For example, in the patent CN1259773A disclosed on Jul. 12, 2000, PVDF-hexalluoropropylene (HFP)+propene polymer (PP)/poly ethylene (PE), etc. are used as gel polymer electrolytes to improve cohesive force between electrode slices; compared with the liquid electrolyte solution, the gel polymer electrolytes are obviously reduced in performance of conductivity, etc., resulting in affecting the magnification, low temperature and cycle performance of the battery. More important, PVDF may react with LixC6, the enthalpy change of the reaction is increased linearly with the increase of x value and the specific surface area of the carbon material, and Maleki, etc. indicated that the reaction of LixC6 and PVDF starts at temperature of 210° C., is up to the maximum exothermic peak at temperature of 287 DEG C., with the heat release of 317 j/g. Therefore, the safety of the PVDF series gel polymer electrolytes in application is limited. In addition, a process for manufacturing the battery by using the technology is complex, and even if the currently-optimized technology is adopted, the battery is also clamped by using large-pressure work fixtures for more than 4 hours in the battery formation process to achieve formation, resulting in occupation of a large number of work fixtures, high energy consumption and high cost.

2. The battery components are bonded by introducing adhesive into the battery to improve the strength of the battery. For example, CN102653656 A discloses a method for improving the anti-wrinkle property of ultrathin batteries, in the method, solvent resin is prepared by taking alcohol or ketone as solvents under high-speed stirring at normal temperature, then add defoaming agent and leveling agent uniformly sprayed between the ultrathin battery electrode slices and the aluminum plastic membrane by using the spray gun. This method able to improve hardness under drying at normal temperature or high temperature. Through this method, although the strength of the lithium battery can be improved, due to the introduction of the alcohol or ketone resin solvent in the battery, the compaction density of the electrode slices is changed, and the injected glue may block ion transmission between the electrode slices and the diaphragm to affect the performance of the battery greatly. And due to the complex process that can not meet the requirement of high volume production. In addition, the patent WO2009/096671 discloses a diaphragm for improving bonding force with the electrodes and an electrochemical device with the diaphragm, a porous coating which is formed on at least one surface of the porous matrix and is prepared by a mixture of a plurality of inorganic particles and an adhesive polymer and a dot coating which is formed on the surface of the porous coating and is provided with a plurality of dots which are prepared from the polymer and are arranged at preset intervals are utilized. In the patent, dot coating is performed on the coating, and the interface of the entire battery is enhanced under the adhesion of rubber polymers of the dot coating and the electrode slices; and in this method, although the interface of the battery is improved, and the integral strength of the battery is enhanced, due to the secondary coating on the porous coating, the process is also complex, and the yield is difficult to control, so this method cannot be used for industrialization. In addition, the rubber compounds have the obvious problems such as swelling, etc. in the lithium battery, resulting in affecting the performance of the battery.

3. Introducing the substances which can adsorb the electrolyte solution into the battery, through reducing the volume of free liquid and improving the force of friction, the strength of the battery is improved. In the disclosed Chinese patent CN 102306725 A, a copolymer of acrylate and acrylonitrile is used as an isolating membrane, the isolating membrane has high absorption capacity on the electrolyte solution, reduces the free electrolyte solution which is not adsorbed by the electrodes and enhances the force of friction between the diaphragm and the electrodes to improve the strength of the battery. In the method, the free electrolyte solution is adsorbed by utilizing the diaphragm to improve the strength of the battery to a certain extent, however, the improvement of the adsorbed free electrolyte solution on the strength of the battery is limited due to small force of friction between the diaphragm and the electrode slices, and due to increase in the volume of the electrolyte solution adsorbed by the diaphragm, the production cost is increased, and the potential safety risk is also increased; In addition, the allowable thickness error of the diaphragm will bring big difficulty to the control of the solution injection volume of the battery, and the batch control to the uniformity of the battery cannot be achieved.

4. Improvement of battery production process and the strength of the battery. Chinese patent CN 102593520 A discloses a method for improving the strength of the lithium ion battery through quick formation, in the method, the aim of reducing the polarization of the battery cell is fulfilled by regulating the prebaking time, prebaking temperature and formation temperature of the battery cell and the pressure to which the battery cell main body is subjected to realize heave-current and quick formation. Finally the lithium ion battery with high strength is prepared by regulating the stopping potential of formation. Compared with the prior art, in the method, due to the elimination of baking by clamping at high temperature for shaping after formation, the capacity of the prepared battery cell is higher; the battery cell is subjected to constant (variable) pressure in the discharging process, so that polarization during charging and discharging is smaller, and the uniformity of the capacity of the prepared battery cell is better; formation is performed at different temperatures in different SOC cut-off modes, thus, the prepared battery cell have high performance and high strength; Although the strength of the battery can be improved in this method, because the technical links related to the method are more, and the time of the process is increased when the formation system is improved, time occupied by equipment is prolonged, equipment which is high in cost proportion and is used for formation is required to be increased, and large industrialized application is difficult to implement.

SUMMARY OF THE INVENTION

The invention aims to provide a water-based composition for modifying the diaphragm of the lithium ion battery, which can improve the strength of the battery cell of the lithium ion battery and simplify the battery production process. The water-based composition is coated on diaphragm which base material is polyolefin, etc. in order to modify the diaphragm, using the modified diaphragm to prepare lithium ion batteries cell, making the diaphragm and the positive and negative electrodes are bonded, so that the battery is high in strength and high in distortion resistance, and the thickness of the battery cell is small in expansion at high temperature.

A first technical problem to be solved by the invention is to provide a water-based composition: the water-based composition for modifying the diaphragm for the lithium ion battery comprises a water-based adhesive for the lithium ion battery and organic nano-particle fillings dispersed in the water-based adhesive; the organic nano-particle fillings are nano-particles of the polymers 1 or nano-particles at least wrapped with the polymers 1 on the surfaces; and the particle sizes of the organic nano-particles are 50 to 2000 nm (preferably 100 to 700 nm).

The polymers 1 are selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA), ethylene-ethyl acrylate copolymer (EEA) or polyurethane (PTU) polymer. The polymers 1 are preferably selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA) or ethylene-ethyl acrylate copolymer (EEA). The polymers 1 are further selected from at least one of polymethyl methacrylate (PMMA), ethylene-vinyl acetate copolymer (EVA), ethylene-acrylate copolymer (EAA) or ethylene-methyl acrylate copolymer (EMA). The polymers 1 are further preferably selected from at least one of ethylene-vinyl acetate copolymer (EVA), ethylene-acrylate copolymer (EAA) or ethylene-methyl acrylate copolymer (EMA).

The nano-particles at least wrapped with the polymers 1 on the surfaces are organic nano-particles with core-shell structures, and the cores in the core-shell structures are the polymers 2 or inorganic particles; the shells are the polymers 1; the polymers 2 are formed by polymerization reaction monomers 1 through the polymerization reaction, and the polymerization reaction monomers 1 are at least one of acrylonitrile, methacrylonitrile, methyl acrylate, methyl methacrylate or vinyl benzene. Further, the polymers 2 are formed by the copolymerization between the polymerization reaction monomers 1 and polymerization reaction monomers 2, and the polymerization reaction monomers 2 are monomers with a crosslinked effect. The polymerization reaction monomers 2 are preferably selected from at least one of divinyl benzene, diacetone-acrylamide, N,N'-methylene bisacrylamide or allyl methacrylate.

Preferably, the nano-particles are at least one of $Al_2O_3$, $SiO_2$, $ZrO_2$, $TiO_2$, $CaO_2$ or MgO.

For the water-based composition for modifying the diaphragm for the lithium ion battery, when the cores of the nano-particles at least wrapped with the polymers 1 on the surfaces are the polymers 2, a method for preparing the nano-particles at least wrapped with the polymers 1 on the surfaces comprises the following steps of: dissolving the polymers 1 in water or the organic solvent, adding the polymerization reaction monomers 1, then heating to the temperature of between 50 and 140 DEG C., and dripping the initiator to initiate the polymerization reaction to obtain a polymer glue solution; and performing precipitation separation or spray drying to obtain the nano-particles, wherein the weight ratio of the polymerization reaction monomers 1 to the polymers 1 is (0.1-6):1, and preferably (1-4):1.

According to the water-based composition for modifying the diaphragm for the lithium ion battery, when the cores of the nano-particles at least wrapped with the polymers 1 on the surfaces are are inorganic particles, a method for preparing the nano-particles at least wrapped with the polymers 1 on the surfaces comprises the following steps of: dispersing the polymers 1 and the inorganic fillings in the water or the organic solvent in a random order to form a polymer glue solution; and performing precipitation separation or spray drying to obtain the nano-particles.

The preference scheme of the water-based composition for modifying the diaphragm for the lithium ion battery is as follows: the water-based composition for modifying the diaphragm for the lithium ion battery comprises the water-based adhesive for the lithium ion battery, the organic nano-particles dispersed in the water-based adhesive and the nano-inorganic fillings. The nano-inorganic fillings are inorganic fillings which are suitable for the diaphragm for the lithium ion battery, such as at least one of $Al_2O_3$, $SiO_2$, $ZrO_2$, $TiO_2$, $CaO_2$ or $MgO$.

The second technical problem to be solved by the invention is as follows: the modified polyolefin diaphragm for the lithium ion battery comprises a micropore polyolefin membrane and a coating, wherein the coating is formed by coating the above water-based composition on the surface of the polyolefin microporous membrane and then drying.

The third technical problem to be solved by the invention is as follows: a method of preparing the water-based composition for modifying the diaphragm for the lithium ion battery comprises the step of dispersing the organic nono-particle fillings in the water-based adhesive uniformly, wherein the organic nono-particle fillings are the nano-particles of the polymers 1 or nano-particles at least wrapped with the polymers 1 on the surfaces.

The nano-particles at least wrapped with the polymers 1 on the surfaces are organic nono-particle fillings with core-shell structures, wherein the cores are polymers 2 or inorganic particles, and the shells are the polymers 1.

Further, in a method for preparing the water-based composition for modifying the diaphragm for the lithium ion battery, when the cores of the nano-particles at least wrapped with the polymers 1 on the surfaces are the polymers 2, the method comprises the following steps of: dissolving the polymers 1 in the water or the organic solvent, adding the polymerization reaction monomers 1, then heating to the temperature of between 50 and 140 DEG C., and dripping the initiator to initiate the polymerization reaction to obtain a polymer glue solution; and performing precipitation separation or spray drying to obtain the Organic nano-particle fillings, wherein the polymers 1 form the shells, and the polymers 2 form the cores and are polymerisates of the polymerization reaction monomers 1.

The polymerization reaction monomers 1 are selected from at least one of acrylonitrile, methacrylonitrile, methyl acrylate, methyl methacrylate or vinyl benzene, wherein the weight ratio of the polymerization reaction monomers 1 to the polymers 1 is (0.1-6):1, and preferably (1-4):1. Further, the polymers 2 are formed by the copolymerization of between the polymerization reaction monomers 1 and the polymerization reaction monomers 2, wherein the weight ratio of the polymerization reaction monomers 1 to the polymerization reaction monomers 2 is (45-55):1, and preferably 50:1, the polymerization reaction monomers 2 are monomers with the crosslinked effect. The polymerization reaction monomers 2 are preferably selected from at least one of divinyl benzene, diacetone-acrylamide, N,N'-methylene bisacrylamide or allyl methacrylate.

In a method for preparing the water-based composition for modifying the diaphragm for the lithium ion battery, when the cores of the nano-particles at least wrapped with the polymers 1 on the surfaces are the inorganic particles, the method comprises the following steps of: dissolving the polymers 1 and the inorganic particles in the water or the organic solvent in a random order to form a polymer glue solution; and performing precipitation separation or spray drying to obtain the organic nano-particles, wherein the polymers 1 form the shells, and the inorganic particles form the cores. The inorganic particles are at least one of Al2O3, SiO2, ZrO2, TiO2, CaO2, or MgO. Preferably, the nano-inorganic particles are monodispersed spheroidal particles with particle sizes of 100 to 1000 nm, and preferably monodispersed spheroidal particles with particle sizes of 300 to 600 nm.

The fourth technical problem to be solved by the invention is as follows: a method for preparing modified polyolefin diaphragm for the lithium ion battery comprises the following steps of: coating the water-based composition on one side or two sides of the polyolefin microporous membrane and drying at temperature of between 40 and 120 DEG C.

The fifth technical problem to be solved by the invention is as follows: the lithium metal secondary battery, the lithium ion secondary battery, the lithium polymer secondary battery and the lithium ion polymer secondary battery which are prepared from the above mentioned modified polyolefin diaphragm for the lithium ion battery.

Advantages of the Invention are as Follows

The advantages of the invention in process, performance and cost:

1. Because the organic nano-particles fillings contained in the water-based composition for modifying the diaphragm for the lithium ion battery are organic nano-particles with the thermal softening adhesive effect or the organic matters which are wrapped on the surfaces of the inorganic nano-particles or polymer nano-particles and have the thermal softening adhesive effect; and compared with the conventional method, the method of the invention has the advantages that the diaphragm can be in good adhesive bonding with the positive and negative electrodes quickly in the hot-pressing process of the battery cell, the effective bonding can be realized by nano points in the hot-pressing process, and the problems of poor absorption of the electrolyte solution by the electrodes or the diaphragm, reduction in transmission channels for lithium ions, etc. which are caused by the blocking of the diaphragm and the electrode micropores due to large bonding areas can be solved effectively, so that the performance of the battery is not affected while the strength of the battery is improved.

Therefore, the prepared modified diaphragm not only keeps high adhesion of the positive and negative electrodes while keeping the heat resistance, high electrolyte retention and high ion conductivity of the diaphragm of the conventional ceramic coating; and but also the bonding force of the modified diaphragm on the positive and negative electrodes can be regulated by the sizes of the organic nano-particle fillings and addition to meet requirements of different varieties of battery cells.

2. The prepared diaphragm for the lithium ion battery can simplify the battery production process greatly, improve production efficiency and reduce production cost; the lithium ion battery prepared from the diaphragm is high in energy density, high in structural strength and high in distortion resistance, and the thickness of the battery cell is small in expansion at high temperature, so that the yield of the battery is improved greatly; and the water-based composition is suitable for producing thinned batteries, the battery production process is simplified, the cost is reduced, and the high performance of the battery is kept.

BRIEF DESCRIPTION OF THE DRAWING

The FIG. 1 is a schematic diagram of the organic nano-particle fillings with core-shell structures, and in the figure, number 1 represents the shells formed by the polymers 1, number 2 represents the cores formed by the polymers 2 or the inorganic particles.

The FIG. 2 is a schematic diagram of coating the diaphragm, number 0 represents the polyolefin microporous membrane, number 3 represents the inorganic nano fillings, number 4 represents the water-based adhesive, and number 5 represents the organic nano-particle fillings, wherein the diaphragm can be coated on one side or two sides; and the coating can be organic nano-particle fillings completely and can also be formed by the organic nano-particle fillings and the inorganic nano fillings.

Figure 1:
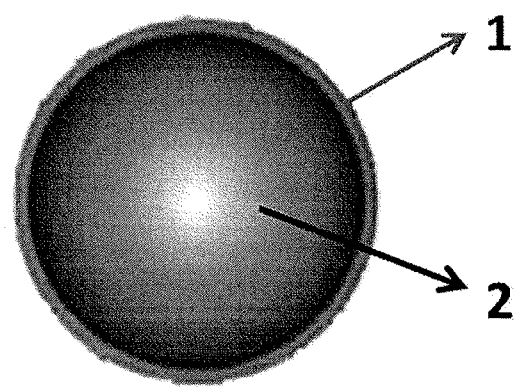
Figure 2:
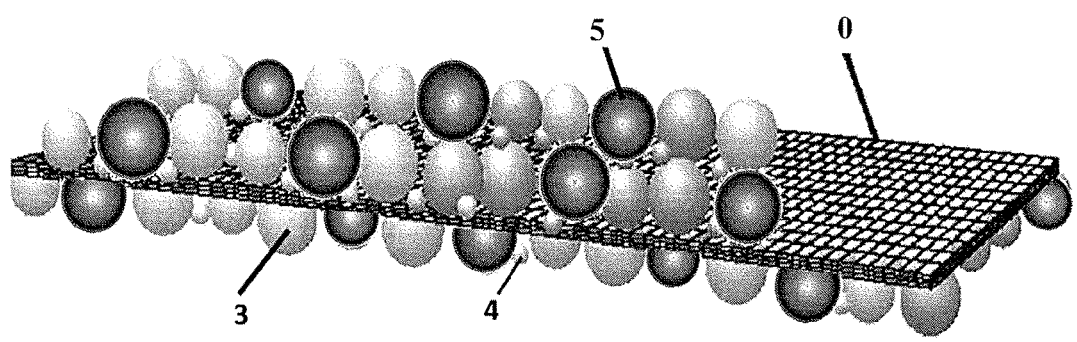
Figure 3:
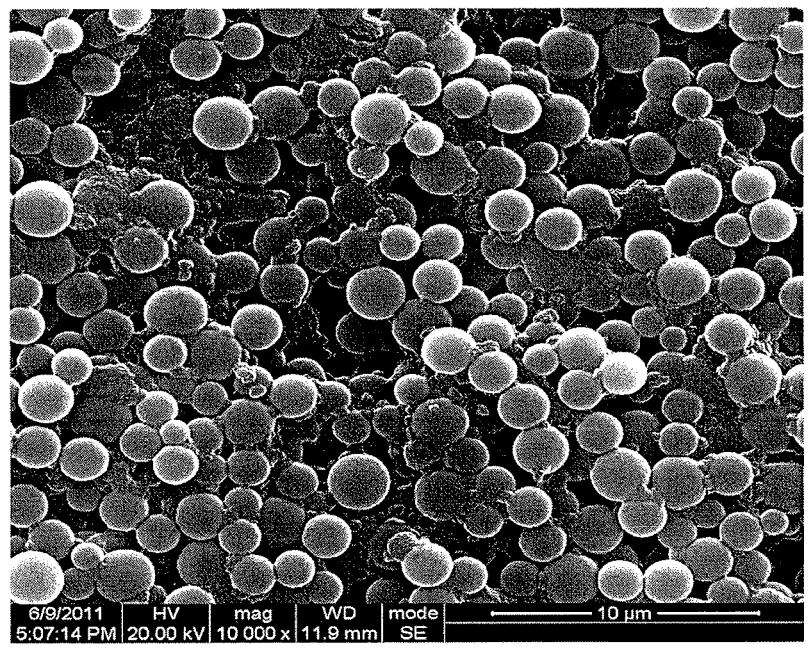

The FIG. 3 is a scanning electron microscope diagram of the organic nano-particle fillings mentioned in the example 1.

Figure 4:
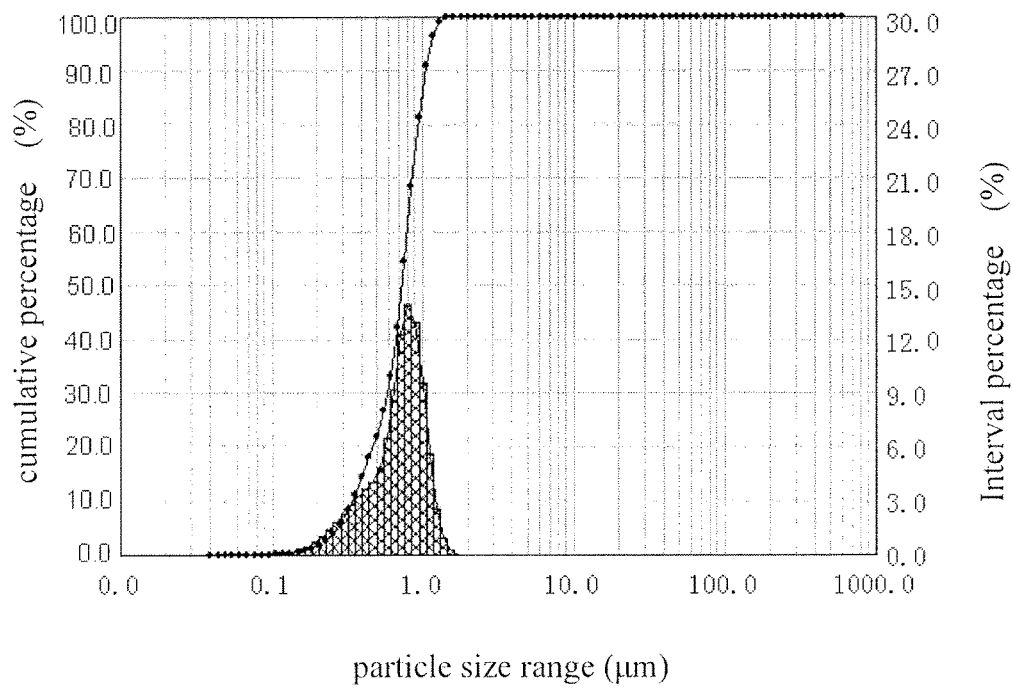

The FIG. 4 is a particle size distribution diagram of the organic nano-particle fillings mentioned in the example 1.

Figure 5:
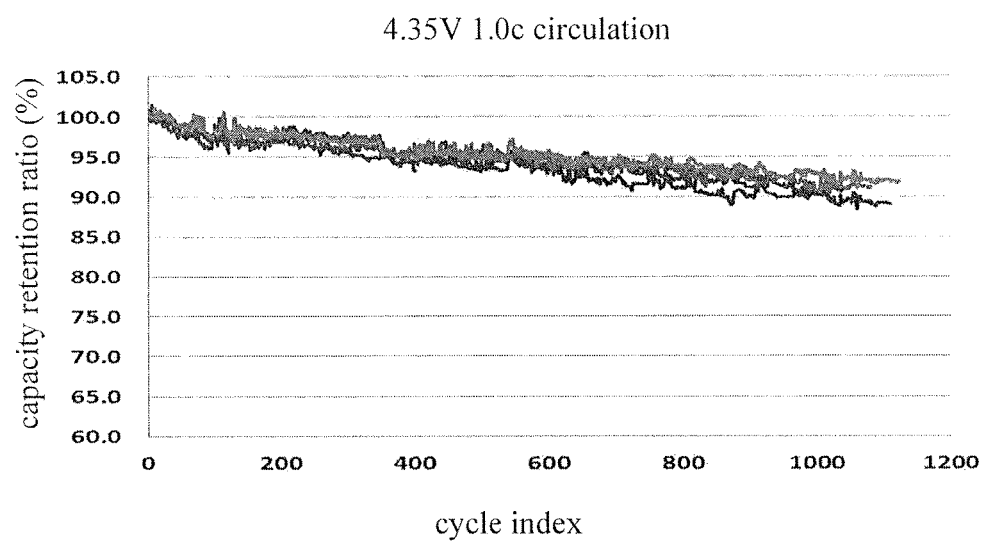

The FIG. 5 is the circularity of six battery cells prepared by the test example 1, as is shown in the figure, after 1000 cycles (1C charging and discharging), the capacity retention ratio is over 90%.

Figure 6:
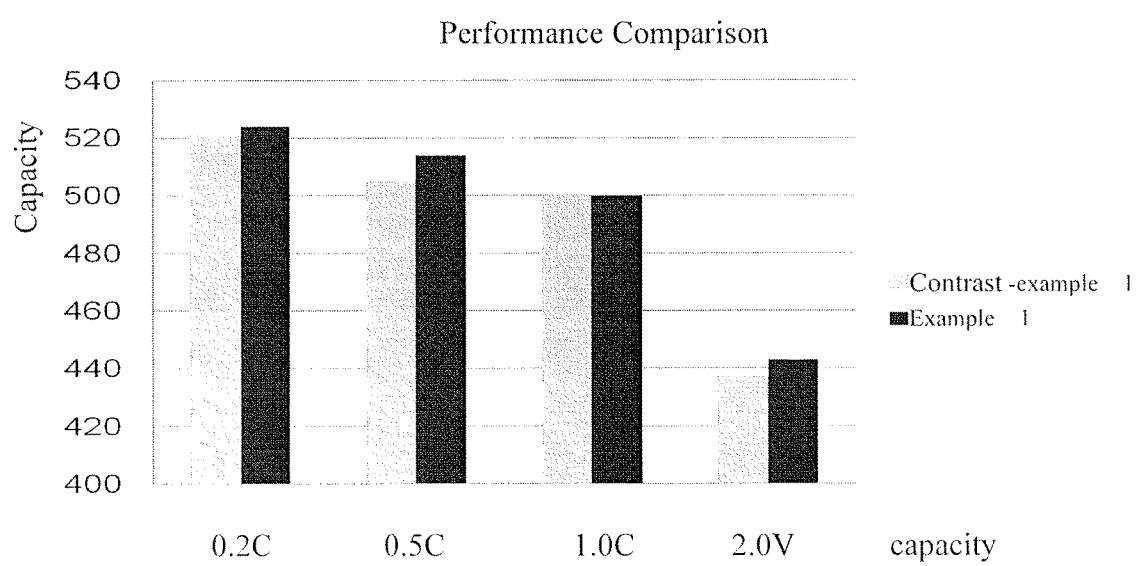

The FIG. 6 is a magnification performance comparison diagram of the battery prepared in the test example 1 and the battery prepared by using the diaphragm in the contrast example 1.

Figure 7:
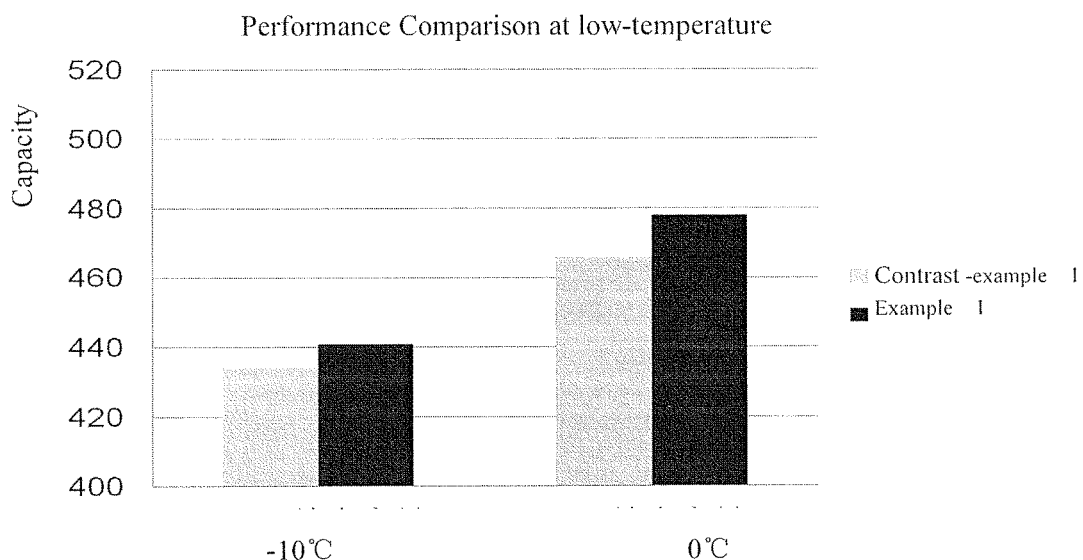

The FIG. 7 is a low-temperature performance comparison diagram of the battery prepared in the test example 1 and the battery prepared by using the diaphragm in the contrast example 1.

Figure 8:
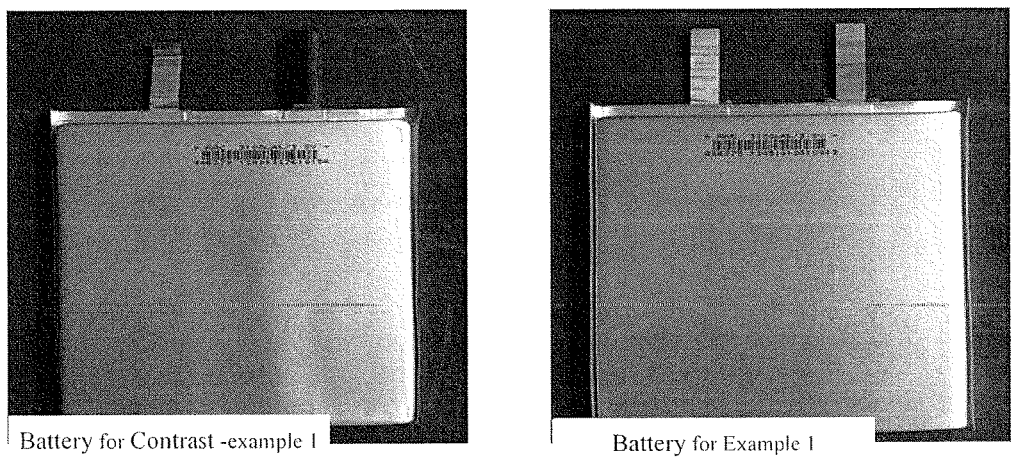

The FIG. 8 is a battery cell appearance comparison diagram of the battery prepared in the test example 1 and the battery prepared by using the diaphragm in the contrast example 1 which circulate for 100 cycles.

Figure 9:
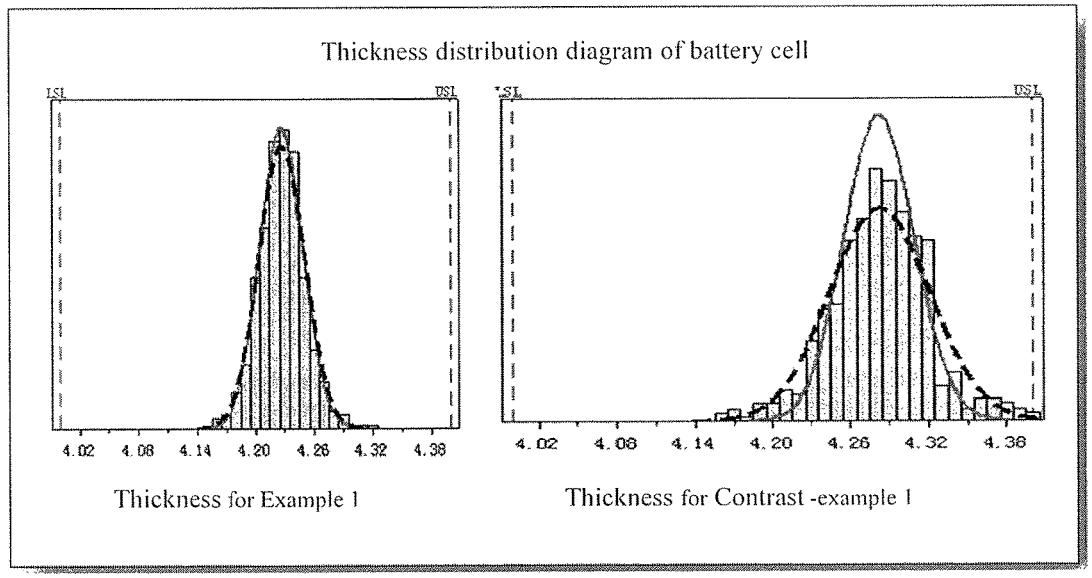

The FIG. 9 is a battery cell thickness distribution diagram of the battery prepared in the test example 1 and the battery prepared by using the diaphragm in the contrast example 1 (statistical data of 50 battery cells prepared from each diaphragm).

Figure 10:
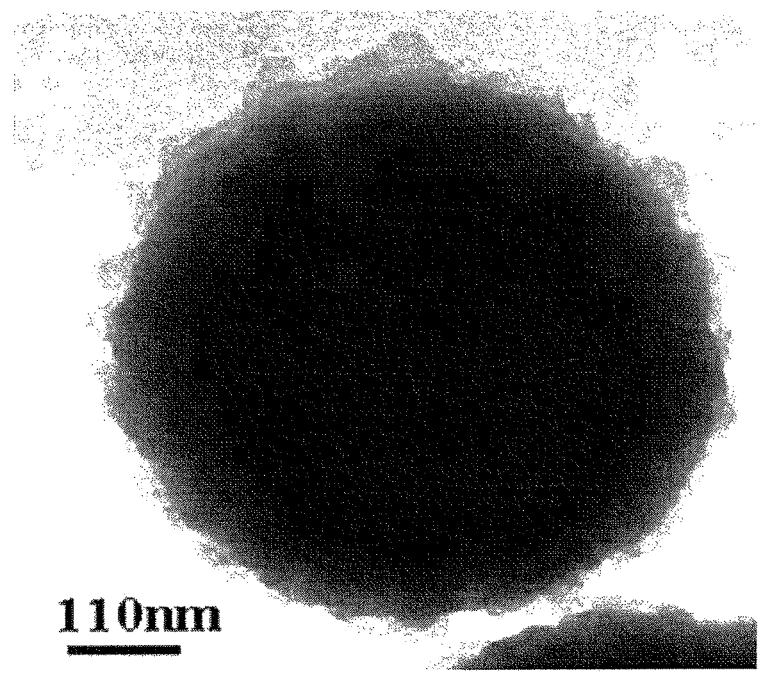

The FIG. 10 is a transmission electron microscope diagram of the organic nano filling particles mentioned in the example 3.

Figure 11:
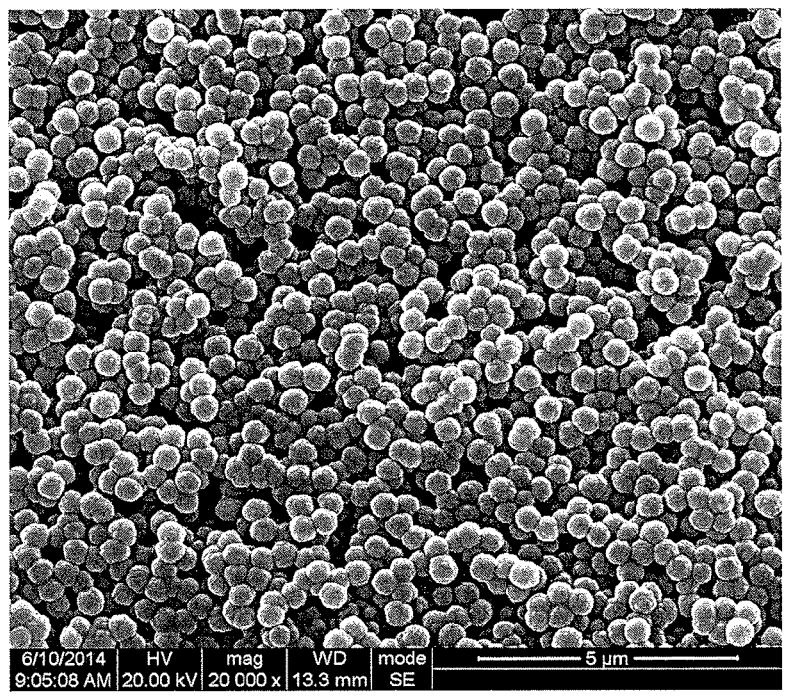

The FIG. 11 is a scanning electron microscope diagram of the organic nano filling particles mentioned in the example 3.

Figure 12:
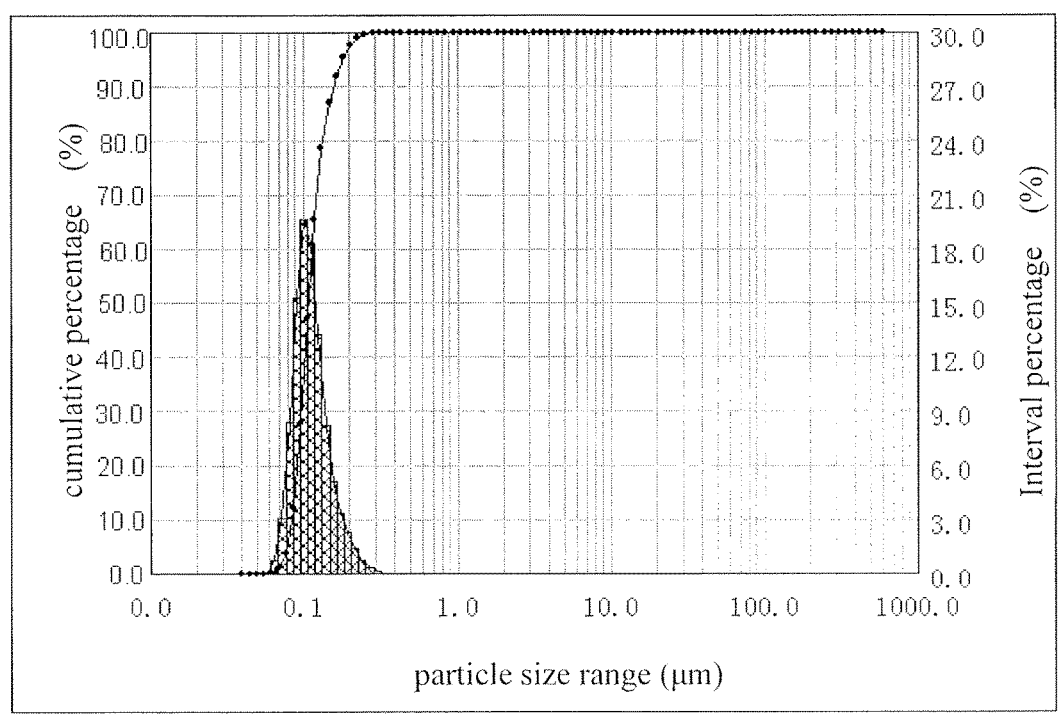

The FIG. 12 is a particle size distribution diagram of the organic nano filling particles mentioned in the example 3.

DETAILED DESCRIPTION OF THE PREFERRED EMBODIMENTS

A first technical problem to be solved by the invention is to provide a water-based composition: the water-based composition for modifying the diaphragm for the lithium ion battery comprises a water-based adhesive for the lithium ion battery and organic nano-particle fillings dispersed in the water-based adhesive; the organic nano-particles are nano-particles of the polymers 1 or nano-particles at least wrapped with the polymers 1 on the surfaces; and the particle sizes of the nano-particles are 50 to 2000 nm (preferably 100 to 700 nm).

The polymers 1 are selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA), ethylene-ethyl acrylate copolymer (EEA) or polyurethane (PTU) polymer. The polymers 1 are preferably selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA) or ethylene-ethyl acrylate copolymer (EEA). The polymers 1 are further selected from at least one of polymethyl methacrylate (PMMA), ethylene-vinyl acetate copolymer (EVA), ethylene-acrylate copolymer (EAA) or ethylene-methyl acrylate copolymer (EMA). The polymers 1 are further on selected from ethylene-vinyl acetate copolymer (EVA), ethylene-acrylate copolymer (EAA) or ethylene-methyl acrylate copolymer (EMA).

The nano-particles of the polymers 1 can be purchased from market sold products, and can also be obtained by dissolving the market sold polymers 1 in the water or the organic solvent and performing spray drying or precipitation, wherein the particle sizes of the nano-particles are 50 to 2000 nm (preferably 100 to 700 nm).

The nano-particles at least wrapped with the polymers 1 on the surfaces are organic nano-particles with core-shell structures, and the cores in the core-shell structures are the polymers 2 or inorganic particles; the shells are the polymers 1;

the polymers 1 are selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA), ethylene-ethyl acrylate copolymer (EEA) or polyurethane (PTU) polymer. The polymers 1 are preferably selected from at least one of polymethyl methacrylate (PMMA), ethylene-vinyl acetate copolymer (EVA), ethylene-acrylate copolymer (EAA), ethylene-butyl acrylate copolymer (EBA), ethylene-methyl acrylate copolymer (EMA) or ethylene-ethyl acrylate copolymer (EEA). The polymers 1 are further selected from at least one of polymethyl methacrylate (PMMA), ethylene-vinyl acetate copolymer (EVA), ethylene-acrylate copolymer (EAA) or ethylene-methyl acrylate copolymer (EMA). The polymers 1 are most preferably selected from at least one of ethylene-vinyl acetate copolymer (EVA), ethylene-acrylate copolymer (EAA) or ethylene-methyl acrylate copolymer (EMA);

the polymers 2 are formed by the polymerization reaction monomers 1 through polymerization reaction, and the polymerization reaction monomers 1 are selected from at least one of acrylonitrile, methacrylonitrile, methyl acrylate, methyl methacrylate or vinyl benzene.

Further, the polymers 2 are formed by the copolymerization of the polymerization reaction monomers 1 and polymerization reaction monomers 2, and the polymerization reaction monomers 2 are monomers with a crosslinked effect. The weight ratio of the polymerization reaction monomers 1 to the polymerization reaction monomers 2 is (45-55):1, are preferably 50:1.

The polymerization reaction monomers 2 are preferably selected from at least one of divinyl benzene, diacetone-acrylamide, N,N'-methylene bisacrylamide or allyl methacrylate.

When the cores of the nano-particles at least wrapped with the polymers 1 on the surfaces are the polymers 2, a method for preparing the nano-particles at least wrapped with the polymers 1 on the surfaces comprises the following steps of: dissolving the polymers 1 in water or the organic solvent, adding the polymerization reaction monomers 1, and then heating to the temperature of between 50 and 140 DEG C., and dripping the initiator to initiate the polymerization reaction to obtain a polymer glue solution; and performing precipitation separation or spray drying to obtain the organic nano-particles, wherein the polymers 1 form the shells, and the polymers 2 form the cores and are polymerisates of the polymerization reaction monomers 1.

When the cores of the nano-particles at least wrapped with the polymers 1 on the surfaces are inorganic particles, a method for preparing the nano-particles at least wrapped with the polymers 1 on the surfaces comprises the following steps of: dispersing the polymers 1 and the inorganic particles in the water or the organic solvent in a random order to form a polymer glue solution; and performing precipitation separation or spray drying to obtain the organic nano-particles, wherein polymers 1 form the shells, and inorganic particles form the cores and are at least one or more than two mixtures of $Al_2O_3$, $SiO_2$, $ZrO_2$, $TiO_2$, $CaO_2$, or MgO. Preferably, the nano-inorganic particles are monodispersed spheroidal particles with particle sizes of 100 to 1000 nm, and preferably spheroidal particles with particle sizes of 300 to 600 nm.

The optimized scheme of the water-based composition for modifying the diaphragm for the lithium ion battery is as follows: the water-based composition for modifying the diaphragm for the lithium ion battery also comprises the nano-inorganic fillings. The nano-inorganic fillings are inorganic fillings which are suitable for the diaphragm for the lithium ion battery or other applicable inorganic fillings, such as at least one of $Al_2O_3$, $SiO_2$, $ZrO_2$, $TiO_2$, $CaO_2$, or MgO, and preferable $Al_2O_3$ nano-particles.

For the addition amount of the inorganic fillings, those skilled in the art can determine in accordance with actual specific condition, generally the addition amount does not exceed 90%, and preferably 40 to 70%. The particle diameters of the nano-inorganic fillings are preferably 10 to 2000 nm, and most preferably 100 to 1000 nm.

The water-based adhesive can be the water-based adhesive which is known for those skilled in the art and is commonly used for the lithium ion battery, for example, acrylate water-based adhesive, butadiene styrene rubber water-based adhesive, styrene-acrylic rubber latex water-based adhesive; or can be the water-based adhesive prepared from water-soluble polymers such as polyacrylic acid and salt thereof, polymethylacrylic acid and salt thereof, sodium carboxymethylcellulose, polyacrylamide, polyvinyl alcohol, etc.

The second technical problem to be solved by the invention is as follows: the modified polyolefin diaphragm for the lithium ion battery comprises a polyolefin microporous membrane and a coating, wherein the coating is formed by coating the above mentioned water-based composition on the surface of the polyolefin microporous membrane and then drying, wherein the polyolefin microporous membrane is polypropylene microporous membrane, polyethylene microporous membrane or three layers compound microporous membranes of polypropylene/polyethylene/polypropylene.

The third technical problem to be solved by the invention is as follows: a method for preparing the water-based composition for modifying the diaphragm for the lithium ion battery comprises the step of dispersing the organic nono-particle fillings in the water-based adhesive uniformly, wherein the organic nono-particle fillings are the nano-particles of the polymers 1 or nano-particles at least wrapped with the polymers 1 on the surfaces.

In the method for preparing the water-based composition for modifying the diaphragm for the lithium ion battery, the nano-particles at least wrapped with the polymers 1 on the surfaces are organic nono-particle fillings with core-shell structures, wherein the cores are polymers 2 or inorganic particles, and the shells are the polymers 1.

In the method for preparing the water-based composition for modifying the diaphragm for the lithium ion battery, when the cores of the nano-particles at least wrapped with the polymers 1 on the surfaces are the polymers 2, the method comprises the following steps of: dissolving the polymers 1 in the water or the organic solvent, adding the polymerization reaction monomers 1, then heating to the temperature of between 50 and 140 DEG C., and dripping the initiator to initiate the polymerization reaction to obtain a polymer glue solution; and performing precipitation separation or spray drying to obtain the organic nano-particles, wherein the polymers 1 form the shells, and the polymers 2 form the cores and are polymerisates of the polymerization reaction monomers 1.

The polymerization reaction monomers 1 are selected from at least one of acrylonitrile, methacrylonitrile, methyl acrylate, methyl methacrylate or vinyl benzene, wherein the weight ratio of the polymerization reaction monomers 1 to the polymers 1 is (0.1-6):1; the formation of the core-shell structure depends on the reaction mode and process condition, and the weight ratio of the polymerization reaction monomers 1 to the polymers 1 determines the thicknesses of core layer and shell layer and the sizes of formed nano filling particles, therefore, the weight ratio of the polymerization reaction monomers 1 to the polymers 1 can be adjusted in accordance with the requirement on filling sizes or the function of the shell layer to form the required nano filling particles with the core-shell structures.

The initiating agent may be water-soluble or oil-soluble initiating agent which is used commonly in the field of emulsion polymerization, such as ammonium persulfate, benzoyl peroxide, azodiisobutyronitrile, and the using amount of the initiating agent is 0.1 to 3% of the total weight of the polymerization monomer.

Further, the polymers 2 are formed by the copolymerization of the polymerization reaction monomers 1 and polymerization reaction monomers 2, and the polymerization reaction monomers 2 are monomers with a crosslinked effect. The polymerization reaction monomers 2 are preferably selected from at least one of divinyl benzene, diacetone-acrylamide, N,N'-methylene bisacrylamide or allyl methacrylate.

In the method for preparing the water-based composition for modifying the diaphragm for the lithium ion battery, when the cores of the nano-particles at least wrapped with the polymers 1 on the surfaces are the inorganic particles, the method comprises the following steps of: dissolving the polymers 1 and the inorganic particles in the water or the organic solvent in a random order to form a polymer glue solution; and performing precipitation separation or spray drying to obtain the organic nano-particles, wherein the polymers 1 form the shells, and the inorganic particles form the cores and are at least one or more than two mixtures of $Al_2O_3$, $SiO_2$, $ZrO_2$, $TiO_2$, $CaO_2$, or MgO. Preferably, the nano-inorganic particles are monodispersed spheroidal particles with particle sizes of 100 to 1000 nm, and preferably spheroidal particles with particle sizes of 300 to 600 nm.

The optimized scheme of the water-based composition for modifying the diaphragm for the lithium ion battery is as follows: the water-based composition for modifying the diaphragm for the lithium ion battery comprises the water-based adhesive for the lithium ion battery, the organic nano-particles dispersed in the water-based adhesive and the nano-inorganic fillings. The nano-inorganic fillings are inorganic fillings which are suitable for the diaphragm for the lithium ion battery or other applicable inorganic fillings, such as at least one of $Al_2O_3$, $SiO_2$, $ZrO_2$, $TiO_7$, $CaO_2$, or MgO, and preferably $Al_2O_3$ nano-particles. The nano inorganic fillings and the organic nano-particle fillings are dispersed in the water-based adhesive uniformly to obtain the water-based composition for modifying the diaphragm for the lithium ion battery. For the addition amount of the inorganic fillings, those skilled in the art can determine it in accordance with actual specific condition, generally the addition amount does not exceed 90%, and preferably 40 to 70%. The particle diameters of the nano-inorganic fillings are preferably 10 to 2000 nm, and most preferably 100 to 1000 nm.

The fourth technical problem to be solved by the invention is as follows: a method for preparing modified polyolefin diaphragm for the lithium ion battery comprises the following steps of: coating the water-based composition for modifying the diaphragm for the lithium ion battery on one side or two sides of the polyolefin microporous membrane and drying at temperature of between 40 and 120 DEG C. to obtain the modified polyolefin microporous membrane, wherein the thickness of the dried coating is controlled to be 2 to 20 um.

In the invention, the method for coating the water-based composition for modifying the diaphragm for the lithium ion battery on the polyolefin microporous membrane may be the general methods in the industry of dip-coating method, roller coating method, spray method or membrane scraping method, etc.

The fifth technical problem to be solved by the invention is as follows: the lithium metal secondary battery, the lithium ion secondary battery, the lithium polymer secondary battery and the lithium ion polymer secondary battery which are prepared from the modified polyolefin diaphragm for the lithium ion battery are used, and also apply to vehicles, such as hybrid power vehicles and electric vehicles.

The electrode which can be used with the diaphragm of the invention is not limited specially, and can be manufactured in accordance with any conventional methods known in the field. In the electrode active materials, the positive electrode active material may be the positive electrode active material of the conventional electrochemical device. Particularly, the positive electrode active material preferably includes but not limited to lithium manganese oxide, lithium cobalt oxide, lithium nickel oxide, lithium ferrum oxide or lithium composite oxide thereof. In addition, the negative electrode active material may be the negative electrode active material of the conventional electrochemical device. Particularly, the non-restrictive example of the negative electrode active material includes the lithium embedded material, such as lithium metal, lithium alloy, carbon, petroleum coke, active carbon, graphite, silicon and silicon and carbon composite materials or other carbon materials.

The electrolyte in the invention comprises salt expressed by a formula $A^+B^-$, wherein $A^+$ represents alkali metal cation, such as $Li^+$, and $B^-$ represents anions, such as $PF_6^-$, $BF_4^-$, $ClO_4^-$, $AsF_6^-$, $CH_3CO_2^-$, $CF_3SO_3^-$, $N(CF_3SO_2)_2^-$ and $C(CF_2SO_2)_3^-$ or combination thereof. The salt can be dissolved or dissociated in the organic solvent which consists of the following substances: propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethyl methyl carbonate (EMC), gamma-butyrolactone or mixture thereof, and also comprises functional actives. However, the electrolyte in the invention is not limited to the above embodiments. The electrolyte can be injected in the appropriate steps in accordance with the preparation method and the required final product performance in the battery preparation process. In other words, the electrolyte can be injected before battery assembly, in the final step of the battery assembly process, etc.

When the diaphragm of the invention is used for the battery, besides the general winding method can be adopted, the diaphragm and electrode folding method and the diaphragm and electrode laminating or stacking method can also be adopted, but it is not limited to the same methods.

The invention is detailed further through the specific embodiments.

EXAMPLE 1

Preparation of Modified Polyolefin Diaphragm for the Lithium Ion Battery a) Preparation of Organic Nano-particle Fillings A method for preparing the organic nano-particle fillings comprises the following steps of: stirring 100 weight parts of acrylic acid-ethylene copolymer (grade: the Dow chemistry EAA5959, particle diameter is 4 to 6 mm,) in a lithium hydroxide aqueous solution with pH of 14 at temperature of 95 DEG C. for 12 hours for dissolving, adding deionized water to regulate the pH value to 10, obtaining precipitate particles of which D90 is less than 1800 nm; and performing centrifugal separation and drying for later use.

The sizes of the nano-particles are represented by the JEOL JSM-5900LV type scanning electron microscope and the BT-2003 laser particle analyzer of Dandong Bettersize Instruments Ltd., with size results shown in the FIGS. 3 and 4.

As is shown from the FIGS. 3 and 4, the sizes of the particles are nanometer, and the particle diameters are less than 1800 nm, and are narrow in distribution.

(b) Preparation of the Water-based Composition for Modifying the Diaphragm for the Lithium Ion Battery A method for preparing the water-based composition for modifying the diaphragm for the lithium ion battery comprises the following steps of: stirring 5 weight parts (by the mass of solid matters) of water-based adhesive in 200 weight parts of distilled water at high speed for uniform dispersing, adding 75 weight parts of EAA organic nano filling particles prepared in (a) and 20 parts of aluminum oxide, after stirring at high speed of 2000 revolutions/minute for 1 hour, adding the uniformly-dispersed mixture into the ball mill, stirring for ball-milling for 12 hours (at rotation speed of 200 revolutions/minute), keeping temperature of between 20 and 30 DEG C., and preparing the water-based composition for modifying the diaphragm for the lithium ion battery, which has 30.5% solid content and 300 centipoises of viscosity (28±1 DEG C.) for later use. In the invention, the water-based adhesive is LA132 water-based adhesive produced by Chengdu INDIGO Co., Ltd., which has 15% solid content.

In the invention, unless particularly specified, all parts are weight parts, the percentage is weight percentage.

(c) Preparation of the Modified Polyolefin Diaphragm for the Lithium Ion Battery A method for preparing the modified polyolefin diaphragm for the lithium ion battery comprises the following steps of: coating the water-based composition on two sides of three layers of PP/PE/PP microporous membranes with the thicknesses of 9 μm in a gravure coating mode at a speed of 20 meters/minute at temperature of 80 DEG C. to prepare the modified polyolefin microporous membrane with the thickness of 13 μm.

CONTRAST EXAMPLE 1

Preparation of PVDF Coating Membrane and Battery

A method for preparing the PVDF coating membrane comprises the following steps of: dissolving polyvinylidene fluoride (PVDF) in an acetone solvent to form slurry with 3% solid content, coating the slurry on two sides of three layers of PP/PE/PP microporous membranes with the thicknesses of 9 μm in a gravure coating mode at a speed of 20 meters/minute, and drying at temperature of 50 DEG C. to prepare the PVDF modified polyolefin microporous membrane with the thickness of 13 μm, wherein the thickness of the coating on each side is 2 μm.

The thermal shrinkage rate and air permeability results of the three layers of unmodified PP/PE/PP membranes, the modified polyolefin diaphragm for the lithium ion battery prepared in the embodiment 1 and the PVDF coating membrane prepared in the contrast example 1 are shown in the table 1.

Air permeability (Gurley) is measured by using the Gurley densometer in accordance with JIS Gurley (Japanese IndustrialStandard Gurley); and the air permeability refers to time (second) of 100 cc of air passing through 1 square inch of diaphragm under 4.8 inches of air pressure.

Thermal shrinkage rate: the diaphragm with the area of 10 cm*10 cm is put into the baking oven at temperature of between ±1 DEG C. in the free state in accordance with the requirement of set temperature for 1 hour, after being cooled, the length and width of the diaphragm are measured, and the shrinkage rate is calculated.

According to the table 1, the modified polyolefin diaphragm prepared in the embodiment 1 keeps the high air permeability (which can indicate the permeation performance of ions) of the conventional polyolefin diaphragm, and improves the heat resistance due to the adoption of the heat-resistant coating, so that the safety of the battery is improved.

TEST EXAMPLE 1

Preparation and Performance Test of Battery
1. Preparation of Negative Electrode Slice A method for preparing the negative electrode slice comprises the following steps of: adding 96% of artificial graphite serving as a negative electrode active material, 3% of polyacrylate serving as an adhesive and 1% of carbon black (super-p) serving as a conducting material into deionized water to prepare a negative electrode mixture slurry; and coating the negative electrode mixture slurry on a copper (Cu) foil current collector with the thickness of 12 μm, drying, and rolling to form the negative electrode slice of which the surface density is 20 mg/cm$^2$ and compaction density is 1.65 g/cm$^3$, wherein the adhesive is the LA 132 adhesive produced by Chengdu INDIGO Power Co., Ltd.

2. Preparation of Positive Electrode Slice

A method for preparing the positive electrode slice comprises the following steps of: adding 94% of lithium cobalt oxide serving as a positive electrode active material, 2% of carbon black (super-p) serving as a conducting material and 4% of 1,1-polyvinylidene fluoride (PVDF) into an N-methyl-2-pyrrolidone (NMP) solvent to prepare a positive electrode mixture slurry; and coating the positive electrode mixture slurry on a copper (Cu) foil current collector with the thickness of 18 μm, drying, and rolling to form the positive electrode slice of which the surface density is 39 mg/cm$^2$ and compaction density is 4.1 g/cm$^3$.

3. Battery Winding and Electrolyte Solution Injection

The battery with the specification of 403040 is prepared by using the above battery and the diaphragm prepared by the embodiment 1; the battery is formed by winding the positive electrode, the diaphragm and the negative electrode, and is packaged by through aluminum plastic composite; and the electrolyte (ethylene carbonate (EC)/ethyl methyl carbonate (EMC)=1/2 (volume ratio)) dissolved with 1 mol/liter of lithium hexafluorophosphate (LiPF6) is injected into the battery and is vacuumized for sealing to obtain the battery cell which is ready to be in the activated state.

4. Battery Formation:

The method for battery formation comprises the following steps of: putting the obtained battery cell into environment at temperature of 45 DEG C. for standing for 20 hours, and shaping the battery cell by hot-pressing at temperature of 95 DEG C. for 1 minute; putting the battery cell on formation equipment directly without clamping of the fixture, performing formation on the battery cell at temperature of between 30±2 DEG C. under the conditions of formation current of 1C ("C" represents the theoretical capacity of the battery cell) and formation stopping potential of 4.35V for 100 minutes; and putting the battery cell in the charge-discharge test machine to perform charging/discharging/charging sequentially, and perform degassing and gas pocket removal on the battery cell to obtain the battery, wherein the stopping potential is 3.8V. In this process, hot and cold pressing is performed for only 8 minutes, each battery is not subjected to formation by the clamping of other fixtures, and the capacity sorting time of entire formation is 270 minutes.

It should note that because the normal performance of the battery is affected due to the serious deformation of the battery caused by formation in the contrast example 1, so the formation in the contrast example 1 cannot be realized in accordance with the same formation method; the formation must be performed under the general formation condition in the industry at present, and the specific condition comprises the following steps of: putting the battery cell at temperature of 45 DEG C. for standing for 20 hours, putting the fully-infiltrated battery cell to be subjected formation into the formation clamps, pressing the surface of the battery cell by the clamps under pressure of 0.6 MPa, putting the battery cell at temperature of 85 DEG C. for prebaking for 60 minutes, and putting the prebaked formation clamps with the battery cell to be subjected formation into the formation machine, and performing formation at temperature of 60 DEG C. under the condition of formation current of 1C and formation stopping potential of 4.35V for 100 minutes; putting the battery cell into the charge-discharge tester to perform charging/discharging and discharging/charging operation at charging/discharging temperature of 35 DEG C. under condition of current of 1C and stopping potential of 3.8V; taking the battery cell out, performing hot on the battery cell at hot pressing temperature of 120 DEG C. under the pressure of 2 MPa, and performing cold pressing at temperature of 45 DEG C. under the pressure of 2 MPa for 15 minutes; and performing degassing and gas pocket removal on the battery cell to obtain the battery. In the process, the time of direction formation is about 420 minutes, but a large number of clamps are used during formation, resulting in high cost, and time of regulating and maintaining clamps in the processes of putting the battery into the clamps, taking the battery out of the clamps and keeping uniformity is more than 60 times, with the total time of 480 minutes.

5. Battery Performance Test 5.1 The capacity discharge, internal resistance and thickness of the battery are shown in the table 2. From the table 2 we know that in the test example 1, the internal resistance, thickness and capacity of the battery are equal and even superior to those of the battery in the contrast example 1.

5.2 Cycle Performance

The current of 1C magnification is charged to constant voltage of 4.35V; the battery is discharged under the current of 1C magnification, the cut-off voltage is 3.0V, and a cycle is completed; and the cycle performance is shown in the FIG. 5, and from the FIG. 5, the colloid particle modified membrane with the core-shell structure is excellent in cycle performance, namely after 1000 cycles (1C charging and discharging), the capacity retention rate is more than 90%, the application requirement of the lithium ion battery is met fully.

5.3. Magnification Test

The current of 0.5C magnification is charged to constant voltage of 4.35V; the battery is discharged under the current of different magnifications (0.2C, 0.5C, 1C and 2C), and the cut-off voltage is 3.0V.

The comparison in the performance of the battery prepared in the test example 1 with the battery prepared in the contrast example 1 is shown in the FIG. 6; and from the FIG. 6, we can know that the colloid particle modified membrane with the core-shell structure is superior to the diaphragm of the contrast example 1 in magnification and low-temperature performance, and the high adhesion of the diaphragm and the battery does give adverse effect to the magnification and low-temperature performance of the battery, but achieves a positive effect.

5.4. Low-temperature Discharging Test

At room temperature, the battery cell is charged to constant voltage of 4.35V under the magnification of 0.2C; the battery is put at different temperatures for 16 hours, and is discharged at corresponding temperature under the current of 0.2C magnification, and the cut-off voltage is 3.0V. The comparison in the performance of the battery prepared in the test example 1 with the battery prepared in the contrast example 1 is shown in the FIG. 7.

5.5. High-temperature Storage Performance Test

At room temperature, the current of the battery cell is charged to constant voltage of 4.35V under the magnification of 0.2C; the battery is put into the constant temperature of 85 DEG C. oven under full power for 5 hours; the battery cell is taken out to be put at room temperature for 5 hours and is discharged under the current of 0.2C magnification, the cut-off voltage is 3.0V, and high-temperature capacity retention rate can be calculated; and the battery cell is charged and discharged at room temperature under constant current of 0.2C to obtain capacity retention rate of the battery stored at high temperature. The high-temperature performance of the battery prepared in the test example 1 with the battery prepared in the contrast example 1 is shown in the table 4.

From the table 4, the battery prepared in the test example 1 is high in high-temperature performance, and after the battery is stored at temperature of 85 DEG C. for 5 hours, the internal resistance and thickness of the battery cell are increased slightly, capacity retention restoration condition is good, and the diaphragm performance is superior to that of the contrast example 1.

6. Battery Buckling and Hardness:

After the battery prepared in the test example 1 and the battery prepared in the contrast example 1 circulate for 100 cycles, the comparison in appearance of the battery is shown in the FIG. 8; and the distribution of the battery cell thickness (statistical data of 50 battery cells prepared from each diaphragm) is shown in the FIG. 9.

From the FIG. 8, the battery prepared in the contrast example 1 has obvious buckling deformation after circulating for 100 cycles in the battery cycle or high-temperature storage process. From the FIG. 9, the batter cell prepared from the PVDF modified membrane in the contrast example 1 is poor in thickness uniformity, indicating the battery cell is high in buckling proportion; and the battery prepared in the test example 1 is high in thickness uniformity, and in the process of using the battery, the battery prepared in the test example 1 is high in dimensional stability and high in strength and provides guarantee for the full development of the battery performance.

The battery strength cannot be embodied directly in a good method, but the inventor of the invention feels that the battery prepared in the test example 1 is high in hardness by means of his handfeel, and from the FIG. 8, it can reflect that the battery prepared in the test example 1 is high in strength and hardness.

EXAMPLE 2

Preparation of Modified Polyolefin Diaphragm of Lithium Ion Battery and Battery (a) Preparation of Organic Nano-particle Fillings In the example, the organic nano-particle fillings are EEA nano powder purchased from the market, and are sieved to obtain nano-particles of which D98 is 1800 nm.

(b) Preparation of Water-Based Composition

The preparation method and operation condition of the water-based composition in the embodiment are basically the same as those of the embodiment 1, the only difference is the weight ratio of water-based adhesive to EEA nano-particles to inorganic fillings is 10:30:60, wherein the water-based adhesive is water-based adhesive sodium polyacrylate (molecular weight is 5 million), and the inorganic fillings are MgO.

The process for preparing the modified polyolefin microporous membrane of the water-based composition in the embodiment is the same as that of the embodiment 1, and the battery preparation process is the same as that of the test example 1.

EXAMPLE 3

Preparation of Modified Polyolefin Diaphragm of Lithium Ion Battery and Battery (a) Preparation of Organic Nano-particle Fillings A method for preparing the organic nano-particle fillings comprises the following steps of: adding 100 weight parts of polymethyl methacrylate (PMMA) into 500 weight parts of acetone solution for full dissolving, adding 300 weight parts of aluminum oxide ($Al_2O_3$) of which the particle diameters D50 are 300 nm, stirring and dispersing uniformly, and performing spray drying to obtain the $Al_2O_3$/PMMA core-shell nano-particles of which the particle diameters D50 are 350 nm and which are wrapped with polymethyl methacrylate (PMMA) on the surfaces. The transmission electron microscope diagram and the scanning electron microscope diagram are shown in the FIGS. 10 and 11, and the particle size distribution diagram is shown in the FIG. 12. From the figure, the particle diameters of the nano-particles with the core-shell structures <500 nm, and particle sizes are narrow in distribution.

(b) Preparation of Water-based Composition

The preparation method and operation condition of the water-based composition in the embodiment are basically the same as those of the embodiment 1, the only difference is the weight ratio of water-based adhesive to $Al_2O_3$/PMMA to inorganic fillings is 5:90:5, wherein the water-based adhesive is mixed solution of styrene-acrylic emulsion and carboxymethylcellulose (the weight ratio is 1:1), and the inorganic fillings are $SiO_2$.

The process for preparing the modified polyolefin microporous membrane of the water-based composition in the embodiment is the same as that of the embodiment 1, and the battery preparation process is the same as that of the test example 1.

EXAMPLE 4

Preparation of Modified Polyolefin Diaphragm of Lithium Ion Battery and Battery
(a) Preparation of Organic Nano-particle Fillings
A method for preparing the organic nano-particle fillings comprises the following steps of: adding 50 weight parts of methyl acrylate-ethylene copolymer (grade: France Kema 14MGC02) into the four-mouth bottle with the condenser pipe and the thermometer, adding 1000 weight parts of xylene solvent, and heating to temperature of 70 DEG C. for dissolving; after dissolving the copolymer fully, adding 100 weight parts of methyl methacrylate and 100 weight parts of acrylonitrile monomer at a time, dripping 200 weight parts of xylene solution containing 5 weight parts of benzoyl peroxide for about 3 hours, and continuing to react at the temperature for 12 hours to obtain polymer rubber latex; and precipitating the polymer rubber latex, performing centrifugal separation, and drying to obtain the nano-particles with core-shell structures.

The process for preparing the water-based composition and the process for preparing the modified polyolefin microporous membrane of the water-based composition in the embodiment are the same as those of the embodiment 1, and the battery preparation process is the same as that of the test example 1.

EXAMPLE 5

Preparation of Modified Polyolefin Diaphragm of Lithium Ion Battery and Battery
(a) Preparation of Organic Nano-particle Fillings
A method for preparing the organic nano-particle fillings comprises the following steps of: dissolving 100 weight parts of ethylene-vinyl acetate (EVA) copolymer (grade: Sinopec V4110F) in 800 weight parts of xylene serving as the organic solvent at temperature of 65 DEG C. for 2 hours, adding 150 weight parts of methyl methacrylate (MMA) and 3 weight parts of allyl methacrylate (AMA) serving as cross-linking agent, dripping 50 weight parts of xylene solution dissolved with 1.0 weight part of azodiisobutyronitrile to initiate a polymerization reaction, after dripping for 3 hours, reacting at constant temperature for 6 hours to obtain polymer glue solution taking the methyl methacrylate-allyl methacrylate copolymer as the core and the ethylene-vinyl acetate copolymer as the shell structure; and performing spray drying on the polymer glue solution to obtain (MMA-AMA)/EVA nano-organic particles of which D90 is less than 1000 nm.

The process for preparing the water-based composition and the process for preparing the modified polyolefin microporous membrane of the water-based composition in the embodiment are the same as those of the embodiment 1, and the battery preparation process is the same as that of the test example 1.

EXAMPLE 6

Preparation of Modified Polyolefin Diaphragm of Lithium Ion Battery and Battery
Other steps of the embodiment are the same as those of the embodiment 1, and the battery preparation process is the same as that of the test example 1. The only difference is the preparation of organic nano fillings, which comprises the following steps of: dissolving 100 weight parts of ethylene-vinyl acetate (EVA) copolymer (grade: Sinopec V4110F) in 800 weight parts of xylene serving as the organic solvent at temperature of 65 DEG C. for 2 hours, adding 10 weight parts of methyl methacrylate (MMA) and 0.2 weight part of allyl methacrylate (AMA) serving as cross-linking agent, dripping 50 weight parts of xylene solution dissolved with 0.1 weight part of azodiisobutyronitrile to initiate a polymerization reaction, after dripping for 1 hours, reacting at constant temperature for 6 hours to obtain polymer glue solution taking the methyl methacrylate cross-linked polymer as the core and the ethylene-vinyl acetate copolymer as the shell structure; and performing spray drying on the polymer glue solution to obtain PMMA/EVA nano-organic particles of which D90 is less than 300 nm.

The air permeability and the shrinkage conditions at different temperatures of different diaphragms prepared in the embodiments 1 to 6 and the contrast example 1 are shown in the table 1; the comparison conditions in the thicknesses, internal resistance and capacity of different diaphragm battery cells prepared in the test example 1, the embodiments 2 to 6 and the contrast example 1 are shown in the table 2; the low-temperature and magnification performance of the battery prepared in the test example 1, the embodiments 2 to 6 and the contrast example 1 are shown in the table 3; the performance of the thickness, internal resistance, capacity, flatness, etc. of the battery which is prepared in the test example 1, the embodiments 2 to 6 and the contrast example 1 and is stored at temperature of 85 DEG C. for 5 hours are shown in the table 4.

TABLE 1

Shrinkagbility of membrane at different temperature and air permeability

| Type of membrane | Shrinkage rate at different temperature (%) | | | | | | air permeability (28° C.) (S/100 cc) |
|---|---|---|---|---|---|---|---|
| | 100° C. | 120° C. | 140° C. | 150° C. | 160° C. | 170° C. | |
| PP/PE/PP | 3 | 9 | 17 | Serious deformation | melt | — | 170 |
| Contrast example 1 | 2 | 6 | 13 | 20 | Serious deformation | — | airtight |
| Example 1 | 1.3 | 3 | 7 | 15 | 20 | deformation | 210 |
| Example 2 | 1.5 | 3 | 9 | 16 | 22 | deformation | 195 |
| Example 3 | 1 | 3 | 6 | 14 | 18 | deformation | 220 |
| Example 4 | 1.8 | 2.8 | 6 | 14 | 26 | deformation | 190 |
| Example 5 | 1.2 | 3 | 7 | 14 | 20 | deformation | 200 |
| Example 6 | 1.2 | 3.5 | 7 | 14 | 20 | deformation | 200 |

In the table 1, "-" expresses unavailable to detection.

From the table 1, compared with the unmodified diaphragm and the coating PVDF diaphragm in the test example 1, the shrinkage data of the modified diaphragm of the invention at different temperatures has the advantages that air permeability is high, the shape is kept well at temperature of 160 DEG C., and temperature tolerance is high, thereby facilitate to the safety of the battery.

TABLE 2

Comparison conditions in thicknesses, internal resistance and capacity of battery

|  | thickness of the battery mm | internal resistance mΩ | capacity of the battery mAh |
|---|---|---|---|
| Contrast example 1 | 3.78 | 61.3 | 526 |
| Test example 1 | 3.75 | 60.1 | 533 |
| Example 2 | 3.75 | 62.0 | 526 |
| Example 3 | 3.75 | 63.2 | 432 |
| Example 4 | 3.75 | 60.4 | 531 |
| Example 5 | 3.73 | 60.3 | 537 |
| Example 6 | 3.75 | 61.0 | 530 |

TABLE 3

The low-temperature and magnification performance of the battery

|  | −10° C. capacity at low temperature (%) | magnification 2 C. |
|---|---|---|
| Test example 1 | 83.6 | 82.9 |
| Example 2 | 85.1 | 84.7 |
| Example 3 | 84.1 | 84.2 |
| Example 4 | 85.6 | 85.6 |
| Example 5 | 83.5 | 83.3 |
| Example 6 | 85.1 | 84.6 |
| Text example 1 | 83.1 | 84.1 |

TABLE 4 the performance of the thickness, internal resistance, capacity, flatness of the battery which is stored at temperature of 85 DEG C. for 5 hours 85° C./5 h

|  | Thickness ratio % | internal resistance rate % | capacity retention rate % | capacity recovery rate % | flatness of the battery |
|---|---|---|---|---|---|
| Contrast example 1 | 4.42 | 13.78 | 89.7 | 92.2 | warping |
| Test example 1 | 1.54 | 1.35 | 92.2 | 95.7 | flattening |
| Example 2 | 1.53 | 1.02 | 91.7 | 95.1 | flattening |
| Example 3 | 1.54 | 1.05 | 92.4 | 95.2 | flattening |
| Example 4 | 1.56 | 1.25 | 92.1 | 95.3 | flattening |
| Example 5 | 1.53 | 0.75 | 92.2 | 95.3 | flattening |
| Example 6 | 1.53 | 1.11 | 93.2 | 94.3 | flattening |

From the table 2, the table 3 and the table 4, the electrical performance of the capacity, internal resistance, low temperature, magnification, cycling, high-temperature restoration, etc. of the battery prepared from the modified diaphragm of the organic nano filling water-based composition prepared in the embodiments 2 to 6 are superior to those of the battery prepared from the PVDF modified diaphragm in the contrast example 1; and in the original thickness, thickness change rate after high-temperature storage, internal resistance change rate and flatness, the strength of the battery in the test example 1 and the embodiments 2 to 6 is higher, the phenomena of buckling, etc. do not occur. In addition, as mentioned in the formation process, compared with the formation process in the contrast example 1 in the current industry, the process in the test example 1 is simplified greatly, the production efficiency is improved, and the cost is reduced.

EXAMPLE 7

Preparation of Modified Polyolefin Diaphragm of Lithium Ion Battery and Battery

The preparation process for the organic nano fillings, the preparation process for the modified polyolefin microporous membrane of the water-based composition and the battery preparation process in the embodiment are basically the same as those of the embodiment 1 and the test example 1, but the only difference is that the size of the prepared batter is increased, and the size specification of the battery is 446379. After the size of the prepared batter is increased, the deformation and buckling of the battery are more serious, the hot-pressing condition in the formation process is changed slightly, namely the battery cell is put into environment at temperature of 45 DEG C. for standing for 20 hours, the hot-pressing condition is changed into hot-pressing at temperature of 100 DEG C. for 5 minutes from the original hot-pressing at temperature of 95 DEG C. for 1 minute, and cold-pressing is performed for 5 minutes to perform shaping on the battery cell; other conditions are not changed, and the capacity sorting time of the entire formation time is increased to 280 minutes (increased by 9 minutes); and the performance and strength of the battery are shown in the table 5.

CONTRAST EXAMPLE 2

Preparation of PVDF Coating Membrane and Battery

The process for preparing the PVDF coating membrane and the battery preparation process are basically the same as those of the contrast 1, but the only difference is that the size of the prepared batter is increased, the size specification of the battery is 446379, and the corresponding formation process is changed.

The change in the formation process condition is as below: the battery cell is put into environment at temperature of 45 DEG C. for standing for 20 hours, and is prebaked at temperature of 85 DEG C. under the pressure of 0.6 MPa for 90 minutes, the capacity sorting time of the entire formation time is increased to 510 minutes (increased by 30 minutes). The specific performance and strength are shown in the table 5.

TABLE 5

The performance of the battery

|  |  |  |  |  | 85° C./5 h | | | |
|---|---|---|---|---|---|---|---|---|
|  | capacity mAh | Initial thickness mm | Internal resistance mΩ | −10° C. capacity rate % | Thickness ratio % | internal resistance rate % | capacity retention rate % | flatness |
| Contrast example 2 | 3169.7 | 4.31 | 29.4 | 85.88 | 8.46 | 14.7 | 88.47 | Serious warping |

TABLE 5-continued

| | The performance of the battery | | | | | | | |
|---|---|---|---|---|---|---|---|---|
| | | | | | 85° C./5 h | | | |
| | capacity mAh | Initial thickness mm | Internal resistance mΩ | −10° C. capacity rate % | Thickness ratio % | internal resistance rate % | capacity retention rate % | flatness |
| Test example 7 | 3316.4 | 4.27 | 27.2 | 87.44 | 1.62 | 1.31 | 95.4 | flattening |

As is shown in the table 5, after the size of the battery is increased, the buckling of the battery prepared in the contrast example 2 is serious, and the change rate of the thickness is obviously increased, so the battery cannot be applied in actual application, and even can affect the basic performance; and the internal resistance of the battery is obviously increased, and the high-temperature storage capacity retention rate is reduced obviously. The strength, process and performance of the battery in the embodiment 7 are not changed obviously with the increase of the size, embodying the advantages in performance and costs in actual application.

The invention claimed is:

1. Water-based composition for modifying a diaphragm for a lithium ion battery, said water-based composition comprising: a water-based adhesive for the lithium ion battery and nano-particles dispersed in the water-based adhesive, wherein:
 (a) the nano-particles are core-shell structures wherein the shell comprises a first polymer coated on the core, and the core comprises a second polymer;
 (b) the nano-particles have particle sizes from 50 to 2000 nm;
 (c) the first polymer is at least one member selected from the group consisting of ethylene-vinyl acetate copolymer (EVA), ethylene-acrylate copolymer (EAA), ethylene-butyl acrylate copolymer (EBA), ethylene-methyl acrylate copolymer (EMA), and ethylene-ethyl acrylate copolymer (EEA);
 (d) the second polymer is at least one member selected from the group consisting of polyacrylonitrile, polymethacrylonitrile, polymethyl acrylate, poymethyl methacrylate and polystyrene;
 wherein the weight ratio of the second polymer to the first polymer is 1.5:1 to 6:1 and wherein the water-based composition produces a modified diaphragm when applied to the diaphragm.

2. The water-based composition according to claim 1, wherein the particle sizes of the nano-particles are 100 to 700 nm.

3. The water-based composition according to claim 1, wherein the first polymer is at least one member selected from the group consisting of ethylene-vinyl acetate copolymer, ethylene-acrylate copolymer and ethylene-methyl acrylate copolymer.

4. Water-based composition for modifying a diaphragm for a lithium ion battery, said water-based composition comprising: a water-based adhesive for the lithium ion battery and nano-particles dispersed in water-based adhesive, wherein:
 (a) the nano-particles are core-shell structures wherein the shell comprises a first polymer coated on the core, and the core comprises a second polymer,
 (b) the nano-particles have particle sizes from 50 to 2000 nm,
 (c) the first polymer is at least one member selected from the group consisting of ethylene-vinyl acetate copolymer (EVA), ethylene-acrylate copolymer (EAA), ethylene-butyl acrylate copolymer (EBA), ethylene-methyl acrylate copolymer (EMA), and ethylene-ethyl acrylate copolymer (EEA), and
 (d) the second polymer is formed by copolymerization between a first polymerization reaction monomers selected from the group consisting of acrylonitrile, methacrylonitrile, methyl acrylate, methyl methacrylate and vinyl benzene and a second polymerization reaction monomers selected from the group consisting of divinyl benzene, diacetone-acrylamide, N,N'-methylene bisacrylamide and allyl methacrylate, which produce crosslinks, and wherein a weight ratio of the first polymerization reaction monomers to the second polymerization reaction monomers is 45:1 to 55:1.

5. The water-based composition according to claim 4, wherein the second polymer is at least one member selected from the group consisting of acrylonitrile-divinylbenzene copolymer, acrylonitrile-diacetone acrylamide copolymer, acrylonitrile-N,N-methylenebisacrylamide copolymer, acrylonitrile-allyl methacrylate copolymer, methacrylic acid methyl-divinylbenzene copolymer, methyl methacrylate-diacetone acrylamide copolymer, methy methacrylate-N,N-methylenebisacrylamide copolymer, methyl methacrylate-methacrylic acid allyl ester copolymer, methyl acrylate-divinylbenzene copolymer, methyl acrylate-diacetone acrylamide copolymer, methyl acrylate-N, N-methylene bis acrylamide copolymer, methyl acrylate-methyl allyl acrylate copolymer, styrene-divinylbenzene copolymer, styrene-diacetone acrylamide copolymer, styrene-N,N-methylenebisacrylamide copolymer, and styrene-methacrylic acid allyl ester copolymer.

6. The water-based composition according to claim 4, wherein the nano-particles are prepared by a process comprising the following steps:
 dissolving the first polymer in water or an organic solvent, adding the first and second polymerization reaction monomers then heating to a temperature from 50 to 140° C., and dripping an initiator to initiate the polymerization reaction to obtain a polymer glue solution, and performing precipitation separation or spray drying to obtain the nano-particles, wherein the weight ratio of the second polymer to the first polymer is 1.5:1 to 6:1.

7. The water-based composition according to claim 1, wherein the water-based composition further comprises nano-inorganic fillings suitable for the diaphragm for the lithium ion battery, and the nano-inorganic fillings are at least one member selected from the group consisting of $Al_2O_3$, $SiO_2$, $ZrO_2$, $TiO_2$, CaO, and MgO.

8. The water-based composition according to claim 3, wherein the water-based composition further comprises nano-inorganic fillings suitable for the diaphragm for the lithium ion battery, and the nano-inorganic fillings are at least one member selected from the group consisting of $Al_2O_3$, $SiO_2$, $ZrO_2$, $TiO_2$, CaO, and MgO.

9. The water-based composition according to claim 4, wherein the water-based composition further comprises nano-inorganic fillings suitable for the diaphragm for the lithium ion battery, and the nano-inorganic fillings are at least one member selected from the group consisting of $Al_2O_3$, $SiO_2$, $ZrO_2$, $TiO_2$, CaO, and MgO.

10. The water-based composition according to claim 5, wherein the water-based composition further comprises nano-inorganic fillings suitable for the diaphragm for the lithium ion battery, and the nano-inorganic fillings are at least one member selected from the group consisting of $Al_2O_3$, $SiO_2$, $ZrO_2$, $TiO_2$, CaO, and MgO.

11. The water-based composition according to claim 6, wherein the water-based composition further comprises nano-inorganic fillings suitable for the diaphragm for the lithium ion battery, and the nano-inorganic fillings are at least one member selected from the group consisting of $Al_2O_3$, $SiO_2$, $ZrO_2$, $TiO_2$, CaO, and MgO.

12. A modified polyolefin diaphragm for a lithium ion battery, comprising the water-based composition according to claim 1 coated on a micropore polyolefin membrane.

13. An energy storing device comprising the modified polyolefin diaphragm according to claim 12.

14. The water-based composition according to claim 4, wherein the weight ratio of the first polymerization reaction monomers to the second polymerization reaction monomers is 50:1.

15. The water-based composition according to claim 6, wherein the weight ratio of the second polymer to the first polymer is 1.5:1 to 4:1.

16. A modified polyolefin diaphragm for a lithium ion battery, comprising the water-based composition according to claim 7 coated on a micropore polyolefin membrane.

17. An energy storing device comprising the modified polyolefin diaphragm according to claim 16.

* * * * *

UNITED STATES PATENT AND TRADEMARK OFFICE
CERTIFICATE OF CORRECTION

PATENT NO. : 10,497,914 B2  
APPLICATION NO. : 15/322357  
DATED : December 3, 2019  
INVENTOR(S) : Zhonglai Pan et al.

It is certified that error appears in the above-identified patent and that said Letters Patent is hereby corrected as shown below:

On the Title Page

Item (54), and in the Specification at Column 1, Lines 1-4, replace the title "WATER-BASED COMPOSITION USED FOR MODIFYING DIAPHRAGM FOR LITHIUM BATTERIES AND MODIFIED DIAPHRAGM AND BATTERIES" with the following title:
-- WATER-BASED COMPOSITION USED FOR MODIFYING DIAPHRAGM FOR LITHIUM ION BATTERIES AND MODIFIED DIAPHRAGM AND BATTERIES --

Signed and Sealed this  
Twenty-eighth Day of January, 2020

Andrei Iancu  
*Director of the United States Patent and Trademark Office*